United States Patent
Nishizawa et al.

(10) Patent No.: US 6,932,924 B2
(45) Date of Patent: Aug. 23, 2005

(54) METHOD AND APPARATUS FOR MOLD CLAMPING IN AN INJECTION MOLDING MACHINE AND THE LIKE

(75) Inventors: Makoto Nishizawa, Shizuoka-ken (JP); Toshihiro Kasai, Shizuoka-ken (JP); Kazuhito Kobayashi, Shizuoka-ken (JP); Yukio Iimura, Shizuoka-ken (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 190 days.

(21) Appl. No.: 10/409,306

(22) Filed: Apr. 9, 2003

(65) Prior Publication Data

US 2003/0189267 A1 Oct. 9, 2003

(30) Foreign Application Priority Data

Apr. 9, 2002 (JP) ........................................ 2002-107215

(51) Int. Cl.[7] .............................................. B29C 45/64
(52) U.S. Cl. .................. 264/40.5; 425/190; 425/450.1; 425/451.2; 425/589; 425/590
(58) Field of Search ...................... 264/40.5; 425/451.2, 425/450.1, 589, 190, 590

(56) References Cited

FOREIGN PATENT DOCUMENTS

| JP | 10-296739 | 11/1998 |
|---|---|---|
| JP | 10-296809 | 11/1998 |
| JP | 10-296810 | 11/1998 |

*Primary Examiner*—Michael P. Colaianni
*Assistant Examiner*—Monica A. Fontaine
(74) *Attorney, Agent, or Firm*—Pillsbury Winthrop Shaw Pittman LLP

(57) ABSTRACT

Method for mold clamping of the present invention is capable of shortening a molding cycle without any initial setting works for an engaging position of a tie bars. The method is constituted the steps of moving the tie bars in the direction of mold closing during mold close operation, judging a relative moving speed between a movable die plate and the tie bar to be within a predetermined value, engaging the tie bars with the movable die plate mechanically by operating an engaging means when the relative moving speed is judged to be within the value, then further moving the movable die plate against a fixed die plate under engagement, and after contact of a movable mold with a fixed mold driving a mold clamping cylinder, thereby executing mold clamping operation.

4 Claims, 9 Drawing Sheets

METHOD AND APPARATUS FOR MOLD CLAMPING IN AN INJECTION MOLDING MACHINE AND THE LIKE

BACKGROUND OF THE INVENTION

1. Field of the Invention

The present invention relates to a method and apparatus for mold clamping in an injection molding machine and the like such as plastic injection molding machine or die casting machine, specifically to that for mold clamping to combine a movable die plate with tie bars mechanically during mold close operation of the movable die plate so as to shorten a molding cycle.

2. Description of Related Art

There are disclosed in Japanese laid open patent numbers 10-296809 and 10-296810, methods for mold clamping to combine the movable die plate with the tie bars mechanically during the mold close operation of the movable die plate so as to shorten the molding cycle.

In the former (10-296809), as shown in FIGS. 4 and 5 (not shown here) of it, there is slidably arranged a movable die plate on tie bars which one ends are fastened to a fixed die plate. The movable die plate is provided with a clamping cylinder near a slide portion with the tie bars, and a piston member of the cylinder protrudes from the movable die plate.

In the movable die plate, there is provided with an open and close mechanism mounting nuts formed with multi-split or divided portions called as half nuts, which engage with a screw portion formed at circumference of the tie bars. The nuts engage with the screw portion by driving the open and close mechanism when the movable die plate reaches a position just before a mold close position.

In the former it is disclosed that engagement of the screw portion with the nuts are possible by arranging plural pairs of half nuts even under movement of the movable die plate.

In the latter (10-296810), as shown in FIG. 1 (not shown here) of it, there is arranged a movable die plate providing with a ram cylinder for mold clamping therein and a pair of half nuts on both sides of the movable die plate through which tie bars passe, one end of the tie bars being fastened to a fixed die plate. The one half nuts near the fixed die plate can move in the direction of the tie bars axes independently. At initial setting an appropriate position is defined for engaging with the tie bars. At each molding cycle operation, the other half nuts engages with the tie bars by driving it after the movable die plate contacts the one half nuts at its end surface during the mold close operation. In the case, the distance between both the half nuts is formed to keep at the value of integral multiple to the screw pitch of the tie bars. In the cases mentioned above, the tie bars are fastened to the fixed die plate.

Another arrangement for moving tie bars themselves during the mold close operation is proposed in Japanese laid open patent number 10-296739 wherein an engaging mechanism operates while both a movable die plate and the tie bars move. Such an arrangement for moving the tie bars themselves are explained, referring to FIGS. 6 to 9 attached.

In FIGS. 6 to 9 a reference numeral 10 represents a fixed die plate. The fixed die plate 10 provides with a fixed mold 12. A movable die plate 18 providing with a movable mold 16 is disposed against the fixed die plate 10 and is capable of advancing and retracting thereto.

A nut member 24 is mounted on the under portion of the movable die plate 18. The nut member 24 is screwed with a screw member 22 coupled through a coupling member 22a to a servomotor 20 for the mold open and close operation, which is fastened to the fixed die plate 10 as a driving means.

Rotating of the screw member 22 causes the movable die plate 18 to advance or retract to the fixed die plate 10, thereby executing the mold open and close operation of the movable mold 16 to the fixed mold 12.

Furthermore, half nuts 28 for mold clamping as one of an engaging means are mounted on the left side of the movable die plate 18 through which tie bars 14 are disposed. The tie bars 14 have a screw or groove portion 14a at its one end portion as the other engaging means, to which the half nuts advance and engage by means of a cylinder 26.

Also, die clamping cylinders 30 are mounted on the fixed die plate 10 at its coupling portion with the tie bars 14. A piston 14b formed at the other end portion of the tie bars 14 are slidably inserted in the cylinders 30.

Accordingly, the tie bars 14 are capable of advancing or retracting in the direction of its axis.

Furthermore, as shown in FIG. 8, there is mounted a servomotor 32 on the out side of the cylinders 30. The servomotor 32 is coupled through a coupling member 31a to a screw member 31 screwed into a rod portion 14c of the tie bars 14 at the piston 14b. Accordingly, the tie bars 14 are moved in the direction of the axis by rotating the servomotors 32. Besides, in FIG. 6, a numeral 34 represents a nozzle portion of the injection molding machine.

In such a complex mold clamping apparatus as illustrated in FIGS. 6 to 9, when works are executed for mounting mold 12 and 16 on the fixed die plate 10 and the movable die plate 18, and for adjusting a distance between them, the engagement between the tie bars 14 and the movable die plate 18 is released by the half nuts 28 to allow the mold close operation starting from a most retracted or opened position.

Then, the servomotor 20 executes the mold close operation. In the case, the half nuts 28 is closed at the most advanced or closed position by operating the cylinders 26.

Usually, it is difficult to appropriately engage the half nuts 28 with the screw portion 14a, because of a phase shift between a screw thread and a screw core of thread in both the half nuts 28 and the screw portion 14a.

To avoid the effect of such a phase shift, the servomotors 32 for moving the tie bars 14 drive it with micro motion, and the servomotors 32 stops to move it at a position that the half nuts 28 and the screw portion 14a are capable of engaging. Then, as shown in FIG. 7, the half nuts 28 comes into appropriate engagement with the screw portion 14a. A position detector (not shown) detects the position of the tie bars 14 corresponding to the appropriate engagement, and the detected value is stored in a memory of a controller (not shown).

Accordingly, in the molding operation after setting the appropriate position, the servomotors 32 controls movement of the tie bars 14 so that the movable die plate 18 always locates at the most advanced position. Thus, the adjusting work finishes by determining the distance between the fixed die plate 10 and the movable die plate 18 when the movable mold 16 contacts with the fixed mold die 12 in the die close operation.

According to the complex mold clamping apparatus as mentioned above, the movable die plate 18 shown in FIG. 6 advances by driving the servomotor 20 after adjusting the engaging position of the half nuts 28 for mold clamping. When the movable die plate 18 reaches a position "B" in FIG. 9 near the most advanced position, the tie bars 14 starts to move in the direction of right in FIG. 9 by driving the servomotors 32, then the servomotors 20 and 32 are controlled so as to synchronize in the relative moving speed between the movable die plate 18 and the tie bars 14, namely so as to become zero in the relative moving speed.

When the relative moving speed between the movable die plate 18 and the tie bars 14 synchronizes at the position "A" in FIG. 9 and then it becomes zero at a specific position, the half nuts 28 operates to close, thereby engaging with the screw portion 14a of the tie bars 14 as shown in FIG. 9.

Also, according to the complex mold clamping apparatus, as mentioned above, molding operation including the mold close operation illustrated in FIG. 9 starts after adjusting the position of the half nuts 28 to engage with the screw portion 14a.

In the molding operation, first, the movable die plate 18 shown in FIG. 6 advances by driving the servomotor 20. When the movable die plate 18 reaches a position "B" in FIG. 9 near the most advanced mold close position, the tie bars 14, which already moved in the left from the position stored in the memory, starts to move in the direction of right in FIG. 9 by driving the servomotors 32, then the servomotors 20 and 32 are controlled so as to synchronize in the relative moving speed between the movable die plate 18 and the tie bars 14, namely so as to become zero in the relative speed, the relative moving speed being processed in the controller.

Then, an engagement between the half nuts 28 and the screw portion 14a is detected at the position "A" when the relative moving speed in the direction of right between the movable die plate 18 and the tie bars 14 is synchronized. In case that the half nuts 28 is at a position appropriate for the engagement the half nuts 28 is operated to close and engage with the screw portion 14a, holding the relative moving speed to be zero by the controller.

When the engagement is completed and the movable die plate 18 reaches the most advanced or close position, the position detector detects a position of the tie bars 14. The detected value is compared with that stored in the memory as the position of the tie bars 14 when adjusting the distance between the movable die plate 18 and the fixed die plate 10. In case of coincidence between the values, the mold clamping and boosting operation starts.

On the other hand, in case of inappropriate position for engagement, the speed of either one of servomotors 20 or 32 is adjusted. In FIG. 9, the servomotors 32 for slidably moving the tie bars 14 are controlled variably in speed as shown in dotted lines. When the tie bars 14 reach an appropriate position "C" in FIG. 9 for engagement, the speed of the tie bars 14 returns to the relative moving speed in synchronization as before. Then, as stated, the half nuts 28 are operated to close and engage with the screw portion 14a, holding the relative moving speed to be zero by the controller.

In this case, without appropriately positioning for engagement, it is also possible to smoothly close the half nuts 28 in such a way that the half nut 28 is provided with wider spiral or square grooves, which engage with the screw portion 14a of the tie bars 14, so as to form the groove with space enough to enter a corresponding screw thread of the screw portion 14a therein.

Second, hydraulic pressured oil is introduced into a chamber 30a for mold clamping operation formed in the die clamping cylinders 30, which generates high clamping force through the tie bars 14. After that, successive processes of injecting melt resin material into a mold through the nozzle 34 of the injection molding machine, filling and cooling are executed to produce molded articles. Then, a die opening process starts.

In the mold opening process, hydraulic pressured oil is introduced into a chamber 30b for return (mold opening in high pressure) formed in the mold clamping cylinders 30. Driving the servomotor 20 in reverse can do the mold opening operation, because the movable die plate 18 is screwed through a nut member 24 with a feed screw member 22. Furthermore, the engagement between the half nuts 28 and the tie bars 14 are released during the mold opening operation, and at the same time driving the servomotors 32 in reverse allows the tie bars 14 to move at the position "B" of FIG. 9 in the direction of left. Thus, one whole cycle of injection molding terminates.

Accordingly, in the complex mold clamping apparatus illustrated in FIGS. 6 to 9 it is possible to shorten the cycle time of one injection molding, because the half nuts 28 can open and close during the mold open and close operation.

In the above, three prior arts disclosed in Japanese laid open patents are illustrated. However, in case of initial setting, namely exchanging the mold to new one, it is necessary for any one of the prior arts to arrange the half nuts so as to be in engagement with the screw portion formed on the tie bars at the specific position, and further to memorize and hold the position mechanically or electrically.

In Japanese laid open patent number 10-296809, the engaging means moves together with the movable die plate to the tie bars, and executes engagement operation while moving. In the case, there is a disadvantage that it takes time because finally the speed of the movable die plate must be set slower, though a plurality of half nuts is provided to suppress a shock at the engagement.

In Japanese laid open patent number 10-296810, a pair of half nuts for mold clamping must be arranged on both side of the movable die plate, respectively.

Therefore, there is a disadvantage in this case that, in addition to a structural complexity another drive means is required to independently drive the half nut located at the one side of the movable die plate.

Furthermore, in the case explained above referring to FIGS. 6 to 9, it is disclosed that while the movable die plate 18 moves, the relative moving speed between the half nuts 28 and the tie bars 18 are controlled and held to become zero, and the half nuts 28 executes engagement operation under the relative moving speed "zero". There is also a disadvantage in the case that drive control for both of the movable die plate and the tie bars are complex because the relative position between the half nuts 28 and the tie bars 18 must be adjusted at an appropriate position for engagement while both of them move.

As shown in FIG. 8, the servomotors 32 are mounted on the end portion of the mold clamping cylinders 30 to slidably move the tie bars. There is also another disadvantage in this case that two different drive means (mold clamping cylinders 30 and servomotors 32) are required for moving the tie bars at two different timings, one of which is for the mold close operation in the direction of axis of the tie bars 14 and the other is for the mold clamping operation.

The inventors of the preset invention have investigated diligently concerning such disadvantages in the prior arts, and as the result, convinced that such disadvantages could be solved by utilizing the relative speed and controlling a timing for driving the engaging means rather than controlling and holding the relative speed to be zero.

SUMMARY OF THE INVENTION

Accordingly, an object of the present invention is to provide a new method and apparatus for mold clamping capable of engaging without any initial setting works for defining an engaging position on a tie bars in an injection molding machine and the like.

To achieve the object, the present invention provides a method for mold clamping in an injection molding machine and the like having a mold clamping mechanism comprising a fixed die plate fixedly mounting a fixed mold thereon, a movable die plate fixedly mounting a movable mold thereon and facing to the fixed die plate, a tie bars supported at one end portion by the fixed die plate and slidably supporting the movable die plate so as to advance and retract to the fixed die plate, a first drive means for executing mold open and close operations by advancing and retracting the movable die plate to the fixed die plate, a second drive means for executing mold clamping operation by pressing the movable die plate against the fixed die plate after the movable mold contacts with the fixed mold by operating the first drive means, a third drive means for executing relative movement between the tie bars and the movable die plate in the direction of the tie bars axis, and an engaging means mounted on the movable die plate for executing an engagement with an engaging portion formed on circumference of the tie bars, the method comprising the steps of starting movement of the tie bars in the direction of mold closing by the third drive means so that the tie bars moves at different moving speed with that of the movable die plate during mold close operation in which the movable die plate moves against the fixed die plate by the first drive means, judging a relative moving speed between the movable die plate and the tie bars within a predetermined value, engaging the tie bars with the movable die plate mechanically by operating the engaging means when the relative moving speed is judged to be within the value, then driving the second drive means, thereby executing mold clamping operation.

Furthermore, to achieve the object, the present invention provides an apparatus for mold clamping in an injection molding machine and the like having a mold clamping mechanism comprising a fixed die plate fixedly mounting a fixed mold thereon, a movable die plate fixedly mounting a movable mold thereon and facing to the fixed die plate, a tie bars supported at one end portion by the fixed die plate and slidably supporting the movable die plate so as to advance and retract to the fixed die plate, a first drive means for executing mold open and close operations by advancing and retracting the movable die plate to the fixed die plate, a second drive means for executing mold clamping operation by pressing the movable die plate against the fixed die plate after the movable mold contacts with the fixed mold by operating the first drive means, a third drive means for executing relative movement between the tie bars and the movable die plate in the direction of axes of the tie bar and an engaging means mounted on the movable die plate for executing an engagement with an engaging portion formed on circumference of the tie bars, and further having a mold clamping controller for drive control of the first drive means, the second drive means, the third drive means and the engaging means, the mold clamping controller constituting a first command division for instructing a low moving speed of the movable die plate to the first drive means during mold close operation, and for instructing a moving speed of the tie bars different from the low moving speed to the third drive means at the same time when the low moving speed is instructed or thereafter, a detector for detecting a relative moving speed between the movable die plate and the tie bars, a setting division for setting a preferable relative moving speed, within which the engaging means is capable of engagement, and a second command division for instructing the engaging operation when an output signal of the detector reaches the preferable relative moving speed.

In the case, the second drive means can be constituted to use also as the third drive means.

Further, in the case, the second drive means and the third drive means can be constituted to provide with a mold clamping cylinders located in the movable die plate, and the third drive means can be constituted to provide with a screw portion formed on circumference of the tie bars which locate at a supporting portion in the fixed die plate, nuts located in the fixed die plate, which is screwed with the screw portion and refrained from moving in the axis direction thereof and a drive motor for rotating the nut.

The apparatus constituted as stated in the above executes a mold clamping operation in such away that, while the mold close operation in which the first drive means moves the movable die plate to the fixed die plate, the third drive means moves the tie bars in the direction of mold closing, and when the relative moving speed between the movable die plate and the tie bars reach within the predetermined value, the engaging means operates to engage the tie bars with the movable die plate mechanically, then after contact of the movable mold with the fixed mold the second drive means operates to press the movable mold to the fixed mold.

BRIEF DESCRIPTION OF THE DRAWINGS

The above and other objects, features, and advantages of the present invention will be made more apparent from the description of preferred embodiments with reference to the accompanying drawings wherein.

DETAILED DESCRIPTION OF A PREFERRED EMBODIMENT OF THE INVENTION

The preferred embodiments will be explained below with reference to FIGS. 1 to 5 of the accompanying drawings.

Figure 1:
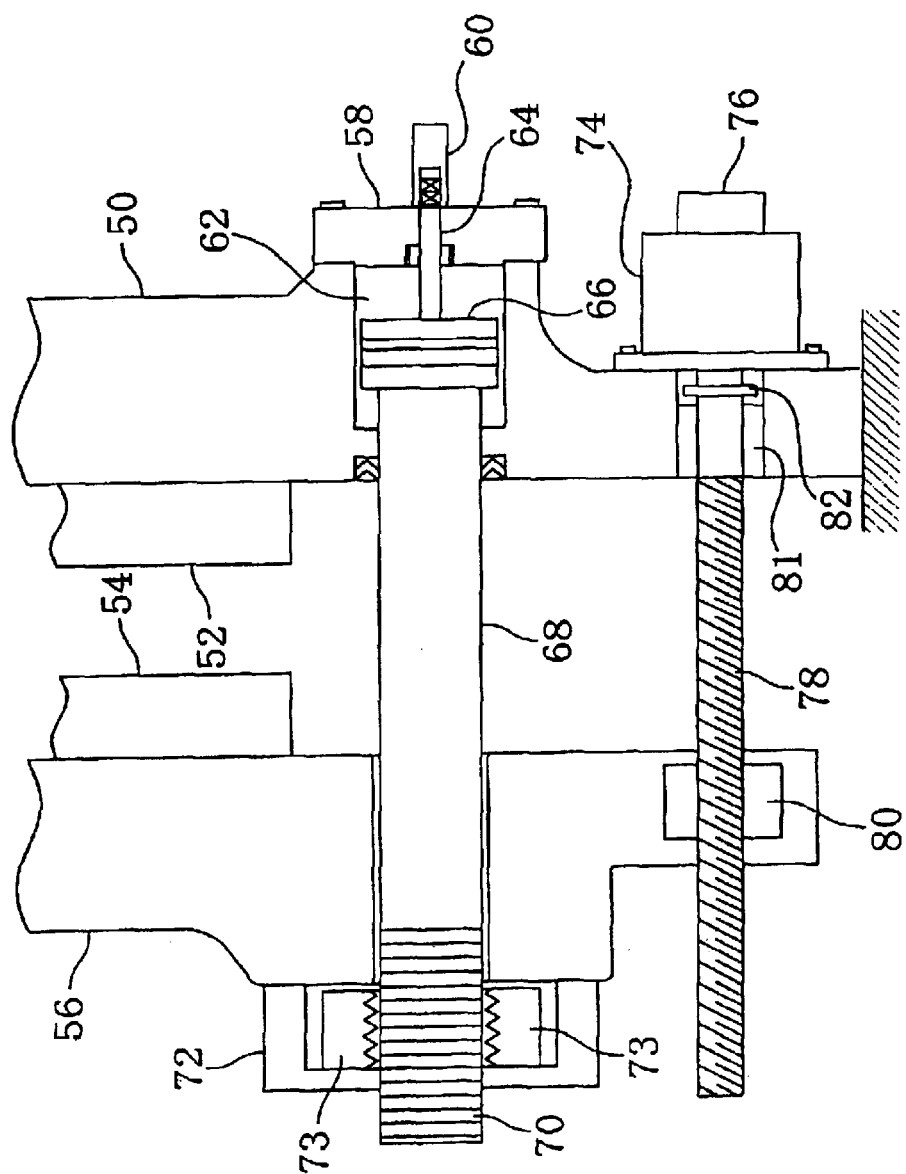
FIG. 1 is an outlined sectional view of the mold clamping mechanism of the present invention.

FIG. 1 shows an outlined sectional view of main portions of the mold clamping mechanism in the injection molding machine.

In FIG. 1, a reference numeral 50 represents a fix die plate on the left side of which a fixed mold 52 is fixedly mounted.

On the other hand, against the fixed die plate 50 there is provided with a movable die plate 56 on the right side of which a moving mold 54 is fixedly mounted.

A reference numeral 68 represents a tie bar. The right end portion of the tie bar 68 is supported on the fixed die plate 50, and the left end portion is slidably inserted in the movable die plate 56.

Incidentally, the injection molding machine usually provides with four tie bars 68, each being located at the corners of the fixed die plate 50 and the movable die plate 56.

Since the each tie bar 68 functions in the same way from the point of the subject matter of the present invention, the only one tie bars 68 is illustrated in FIG. 1. Furthermore, in FIG. 1 upper portions of the fixed die plate and the movable die plate 56 are omitted for want of space.

A reference numeral 78 represents a feed screw used for the mold open and close operation in which the movable die plate 56 advances and retracts to the fixed die plate 50. The right end portion of the feed screw 78 is rotatably supported by a bearing member 81 mounted on the fixed die plate 50 and further connected through a coupling 82 to the drive axis of an AC (alternative current) servomotor 74 mounted on right side of the fixed die plate 50. A reference numeral 76 represents a rotary encoder.

The left side portion of the feed screw 78 screws a nut 80 mounted on the movable die plate 56. Therefore, the movable die plate 56 is slidably guided by the tie bar 68, and is capable of advancing and retracting to the fixed die plate 50. The encoder 76 always detects a moving distance and a moving direction of the movable die plate 56. The detected information is given to a mold clamping controller shown in FIG. 2, and utilized for position control of the movable die plate 56.

A reference numeral 62 represents a mold clamping cylinder formed in the fixed die plate 50, on the right end surface of which a cover 58 is mounted. A piston 66 of the mold clamping cylinder 62 is mounted on the right end portion of the tie bar 68. A detecting rod 64 for detecting a position is fastened to the piston 66 at the left end and protrudes through the cover 58 to a tie bar position sensor 60.

The tie bar position sensor 60 detects a position of the tie bar 68 in a way that the detecting rod 64 moves together with the piston 66. There is formed a screw 70 on the circumference of the left portion of the tie bar 68, which engages to a pair of half nuts 73 in a known engaging means 72. The engaging means 72 is mounted on the left side of the movable die plate 56. The engaging means 72 and the half nut 73 constitute an engaging portion of the present invention. The detail for supply and discharge of hydraulic pressured oil is omitted here.

Though the engaging means 72 is illustrated as a hydraulic system, it is also possible to arrange the engaging means 72 in a way that the half nut 73 is advanced or retracted to the screw 70 by utilizing an electric motor.

In the above, the main portion of the mold clamping mechanism, to which the present invention is applied, is explained referring to FIG. 1. The point is such that while the movable die plate 56 moves at a low speed in the direction of right in FIG. 1 under the mold close operation, the engaging means 72 operates and finishes the engagement, moving the tie bar 68 in the same direction by driving the mold clamping cylinder 62, thereby enabling to omit works for adjusting the mold thickness required at the initial setting, namely, the works done from the past that the engaging means 72 executes engaging operation under the state of once closing the molds 52 and 54.

Figure 2:
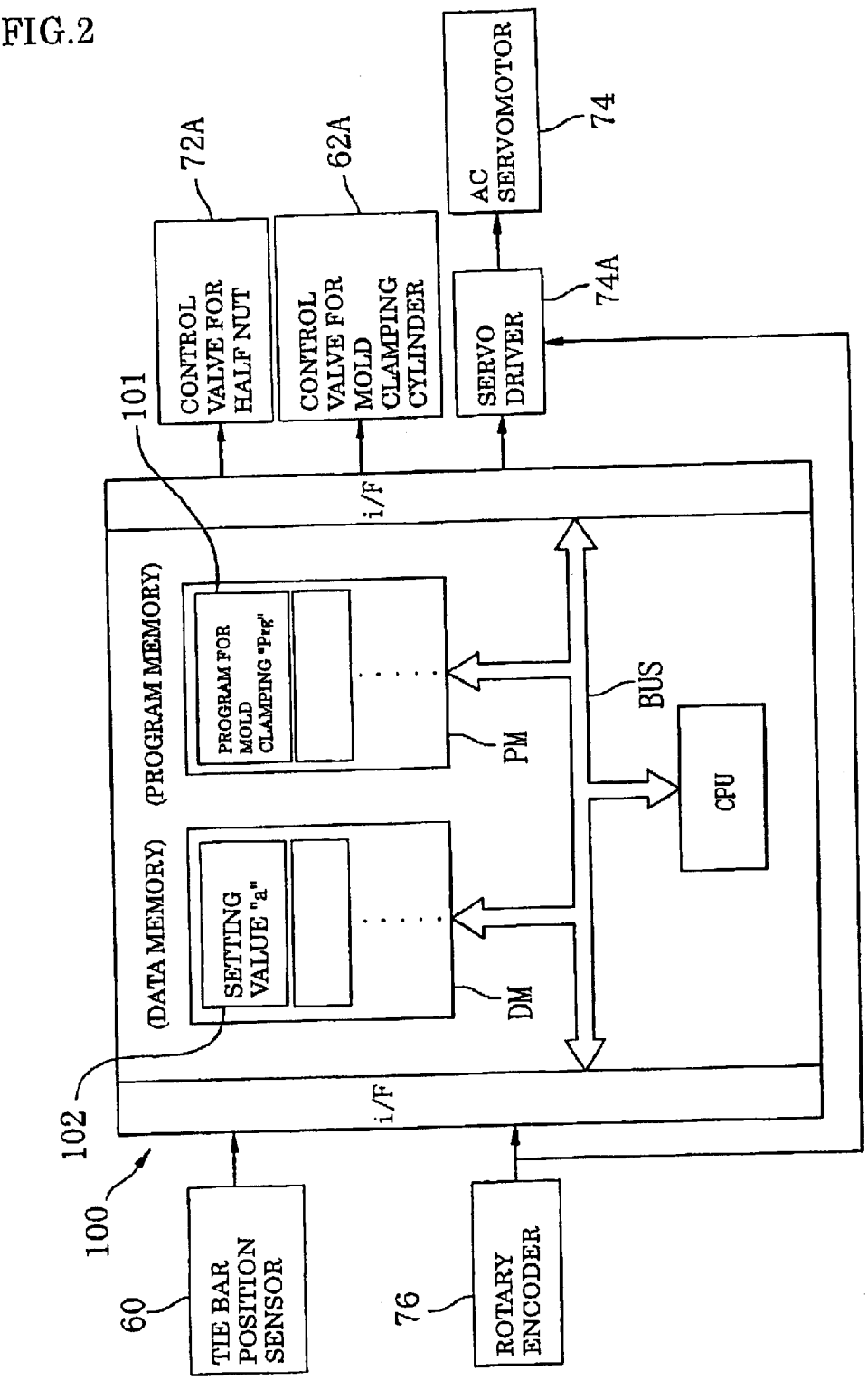
FIG. 2 is a control block diagram of a controller for the mold clamping mechanism shown in FIG. 1.

FIG. 2 illustrates a control block diagram of a controller for the mold clamping mechanism shown in FIG. 1. In FIG. 2, a reference numeral 100 represents an operation processing division for controlling mold clamping operations. The operation processing division 100 is constituted from a central processing unit CPU, a bus BUS connected to the CPU, a data memory DM and a program memory PM connected to the BUS, and an interface unit iF for sending and receiving signals between input/output devices located outside. The interface unit iF provides with the functions of A/D converter and D/A converter.

Reference numerals 60 and 76 represent the tie bar position sensor and the rotary encoder as explained in FIG. 1, each supplying input signals through the interface unit iF to the operation processing division 100. On the other hand, the output signals that the operation processing division 100 produces are given through the interface unit iF to a control valve 72A for drive control of the engaging means 72 with the half nut 73, a control valve 62A for drive control of the mold clamping cylinder 62 and a servo-driver 74A for drive control of the AC servomotor 74. In the case, a signal from the rotary encoder 76 to the servo-driver 74A is used for feedback control of the AC servomotor 74.

There is provided with a memory area 101 in the program memory PM of the operation processing division 100 for storing a control program for mold clamping operation, that is, a series of instructions given to the CPU for executing mold clamping operations.

Further, there is provided with a memory area 102 in the data memory DM of the operation processing division 100. In the memory area 102 there is predeterminedly stored setting values "a" allowable as the relative speed, that is, values of difference between the moving speeds of the movable die plate 56 and the tie bar 68 during the mold close operation.

In the data memory, besides the setting values "a", there are provided with memory areas storing various data necessary for drive control of the mold clamping mechanism, such as a real position and speed of the tie bar 68, a real position and speed of the movable die plate 56, a moving speed instruction value and a speed change position or time to a low speed for the movable die plate 56, a starting position or time and speed for moving the tie bar 68, and a time for the engagement completion by the engaging means 72. The details are omitted here.

Figure 3:
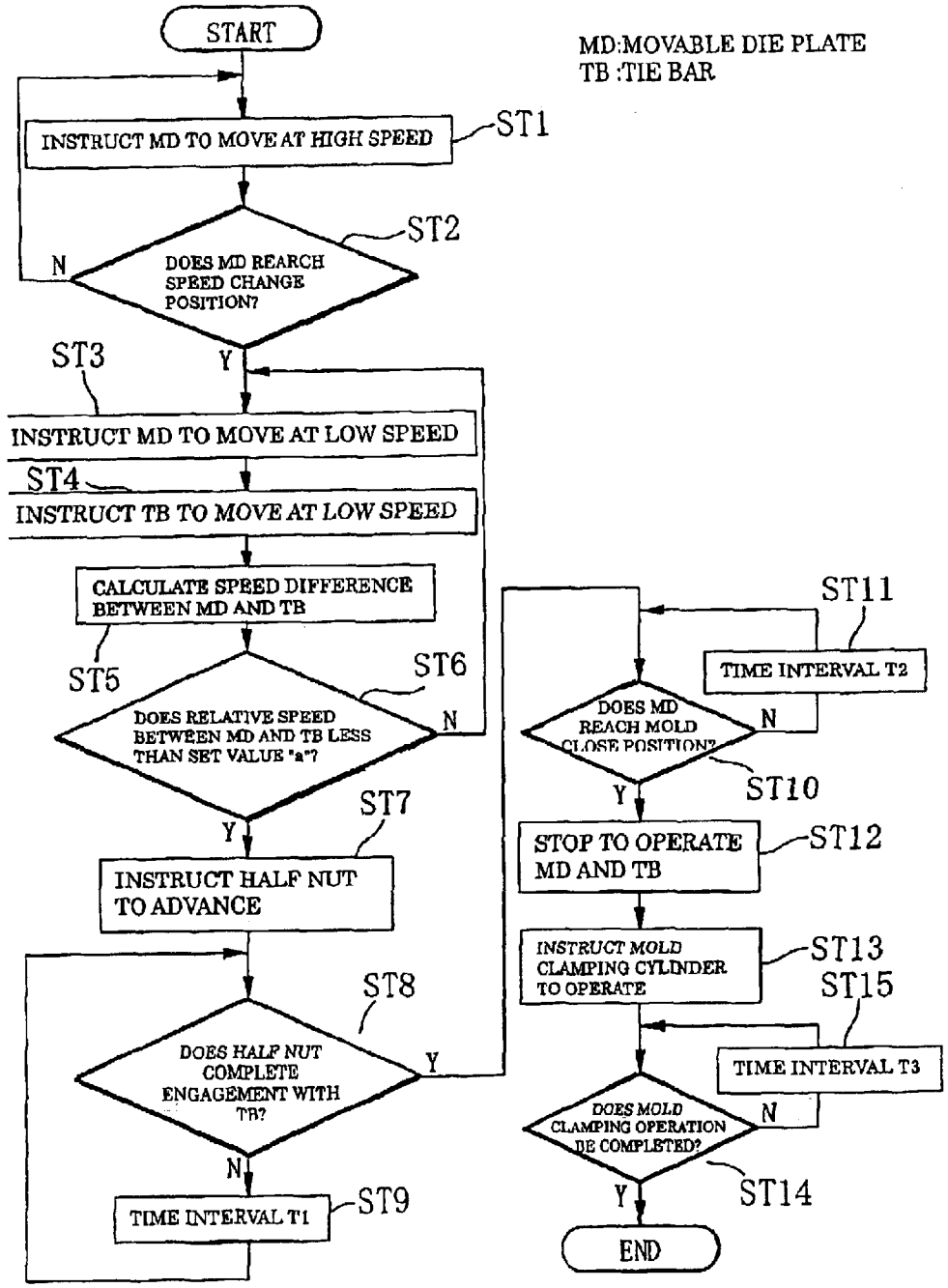
FIG. 3 is a flow chart for explaining the control program for mold clamping operation.

FIG. 3 illustrates a flow chart for explaining the control program for mold clamping operation stored in the memory area 101 in the program memory PM.

Figure 4:
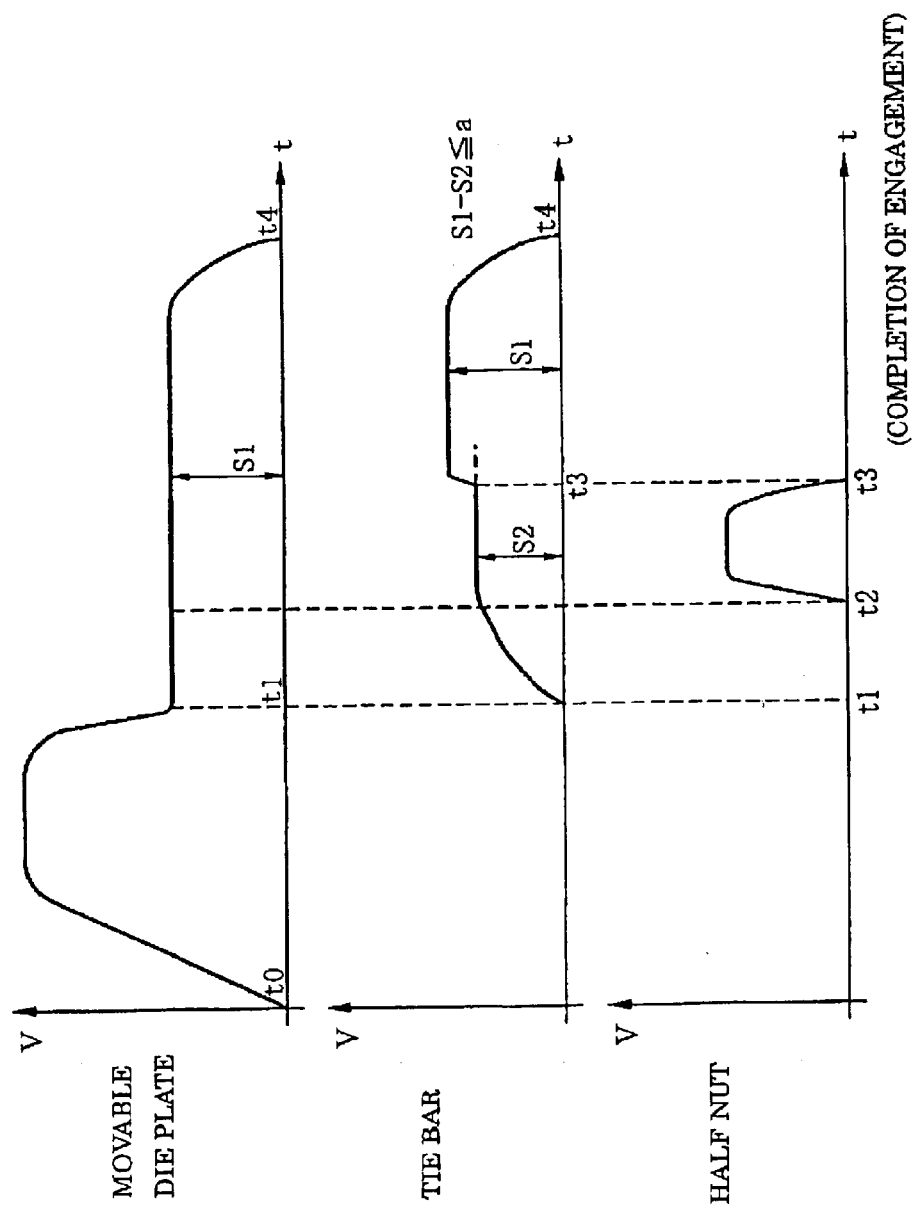
FIG. 4 is a chart showing speed diagrams of the movable die plate, the tie bars and the half nut.

FIG. 4 illustrates a chart showing speed diagrams of the movable die plate 56, the tie bar 68 and the half nut 73 in the engaging means 72 during the mold close operation, respectively. The process of the mold clamping operation is explained below in accordance with each step in the flow chart of FIG. 3, referring to FIGS. 1, 2 and 4.

Abbreviated letters MD and TB for the movable die plate and the tie bar are respectively used in the flow chart, because of convenience for description.

The control program for mold clamping operation is initiated in response to an instruction of mold close operation given from a controller (not shown) of the injection molding machine.(START)

At step ST1, it is instructed that the movable die plate 56 advances, that is, moves against the fixed die plate 50 at a high speed set predeterminedly. Then, at step ST2, it is judged whether or not the movable die plate 56 reaches a position to change to a low speed. (The position corresponds to the time "t1" in FIG. 4)

In case that the judgment at the step ST2 is negative (hereinafter merely described as "N"), the high speed is still held. Also, in case that the judgment at the step ST2 is positive (hereinafter merely described as "Y"), it is instructed at step ST3 that the movable die plate 56 moves at the low speed.

Then, at step ST4, it is instructed that the tie bar 68 moves at a low moving speed under the condition that the position or time to start the moving operation of the tie bar 68 is the same with the time "t1" corresponding to the speed change position of the movable die plate 56. (a drive instruction to the control valve 62A for mold clamping cylinder 62)

Further, at step ST5, it is instructed to calculate differences between the moving speeds of the movable die plate 56 and the tie bar 68, that is, relative speed from the real moving speeds of them. The respective real moving speed is given by differentiating the position signals from the tie bar position sensor 60 and the encoder 76 in FIG. 2.

At step ST6, it is judged whether or not the relative speed are less than the set values "a" stored in the memory area 102 of the data memory DM. In case of the judgment "N" at step ST6, it is instructed to repeat steps ST3 to ST6. In case of the judgment "Y" at step ST6, it is instructed at step ST7 that the half nut 73 advances against the screw portion 70 of the tie bar 68. (a drive instruction to the control valve 72A for the nut with divided portions in FIG. 2)

In the case, a command moving speed to the tie bar 68 is defined, as shown in FIG. 4 as S2, in such a way that difference between the command speed and the command low moving speed S1 to the movable die plate 56 is less than the setting values "a".

Further, it is judged at step ST8 whether or not an engagement is completed. In case of the judgment "N", it is instructed at step ST9 to wait for a time interval "T1" and then repeat step ST8.

Also, in case of the judgment "Y" (corresponding to a time "t3" as shown in FIG. 4), it is instructed at step ST10 whether or not the movable die plate 56 reaches the mold close position. In case of the judgment "N", it is instructed at step ST11 to wait for a time interval "T2" and then repeat step ST10. Also, in case of the judgment "Y" (corresponding to a time "t4" as shown in FIG. 4), it is instructed at step ST12 to stop moving of the movable die plate 56 and the tie bar 68.

Then, it is instructed at step ST13 to supply hydraulic pressured oil to the chamber located at the left side of the mold clamping cylinder 62 so as to execute the mold clamping operation. Further, it is judged at step ST14 whether or not the mold clamping operation is completed. In case of the judgment "N" it is instructed at step ST15 to wait for a time interval "T3" and then repeat step ST14. Also, in case of the judgment "Y" at step ST14 it is instructed to inform the completion of mold clamping operation to the controller.

Furthermore, though not shown in the flowchart, it is instructed that the tie bar 68 is forced to move together with the movable die plate 56 at the low moving speed after the time "t3" corresponding to the engagement completion judged at step ST8. Accordingly, as shown in FIG. 4, the speed S2 of the tie bar 68 is adjusted to S1 after the time "t3". In this case, it is also instructed that the control valve 62A adjusts supplying and discharging of hydraulic pressured oil to the mold clamping cylinder 62 so that the tie bar 68 does not disturb the movement of the movable die plate 56 at the low moving speed.

Further, in the explanation of the flowchart mentioned above, it is assumed, as shown in FIG. 4, that the time to start the moving operation of the tie bar 68 is the same with the time "t1" corresponding to the moving speed change from high to low of the movable die plate 56. However, the time to start the moving operation of the tie bar 68 can be delayed.

In FIG. 4, the time interval (=t3−t2) corresponds to a time passage between the start of moving and the completion of engagement with regard to the half nut 73. The time interval varies in accordance with the relative speed between the movable die plate 56 and the tie bar 68, and a phase shift condition at the time "t2" between the half nut 73 and the screw portion 70 of the tie bar 68.

Accordingly, it is possible to shorten the time interval by changing the moving speed of the movable die plate 56 or the tie bar 68 within the allowance "a" while monitoring the time interval.

Further, in case that the phase shift is nearly equal to one pitch at monitoring the first mold clamping operation, it is possible to modify the control program for the next mold clamping operation so as to delay the time to start the tie bar 68 by an appropriate time interval, taking into account of the difference between the moving speeds and degrees of the phase shift.

Figure 5:
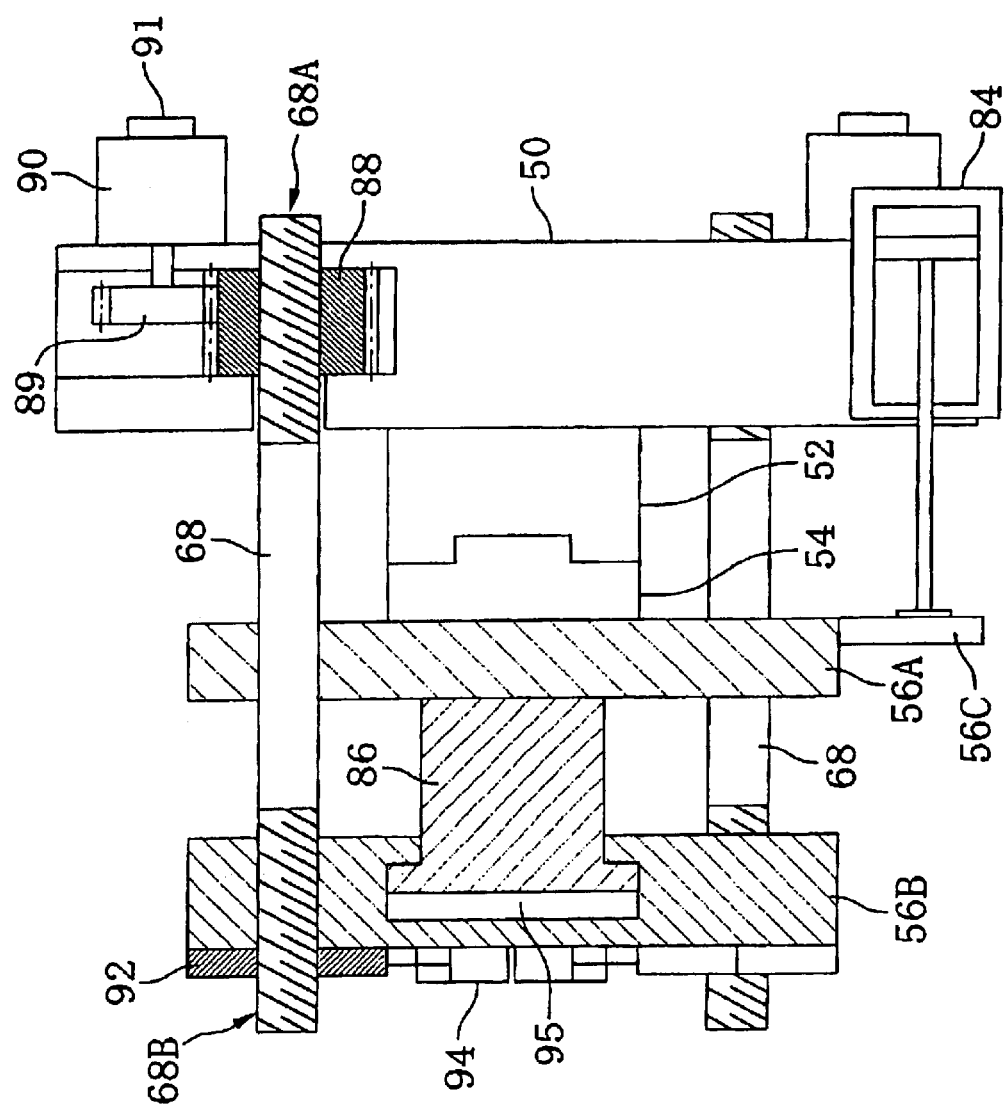
FIG. 5 is another mold clamping mechanism of the present invention.
Figure 6:
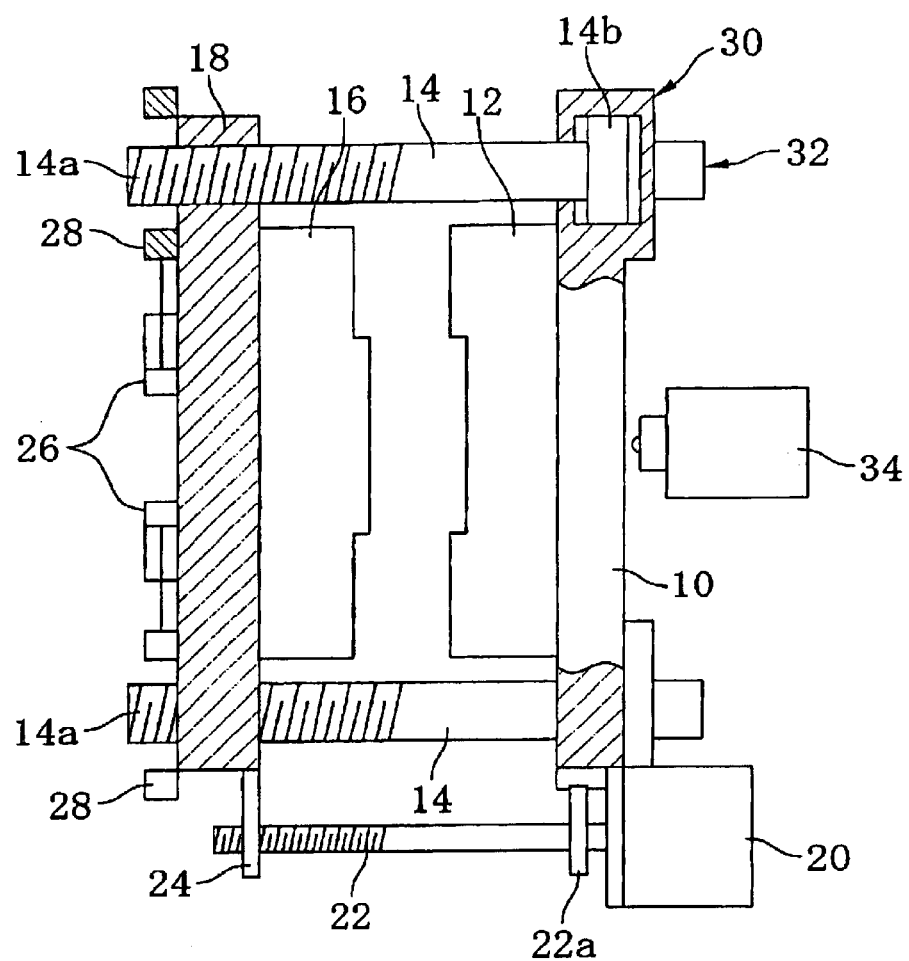
FIG. 6 is an outlined sectional view of the mold clamping mechanism with a pair of molds opened of the prior art.
Figure 7:
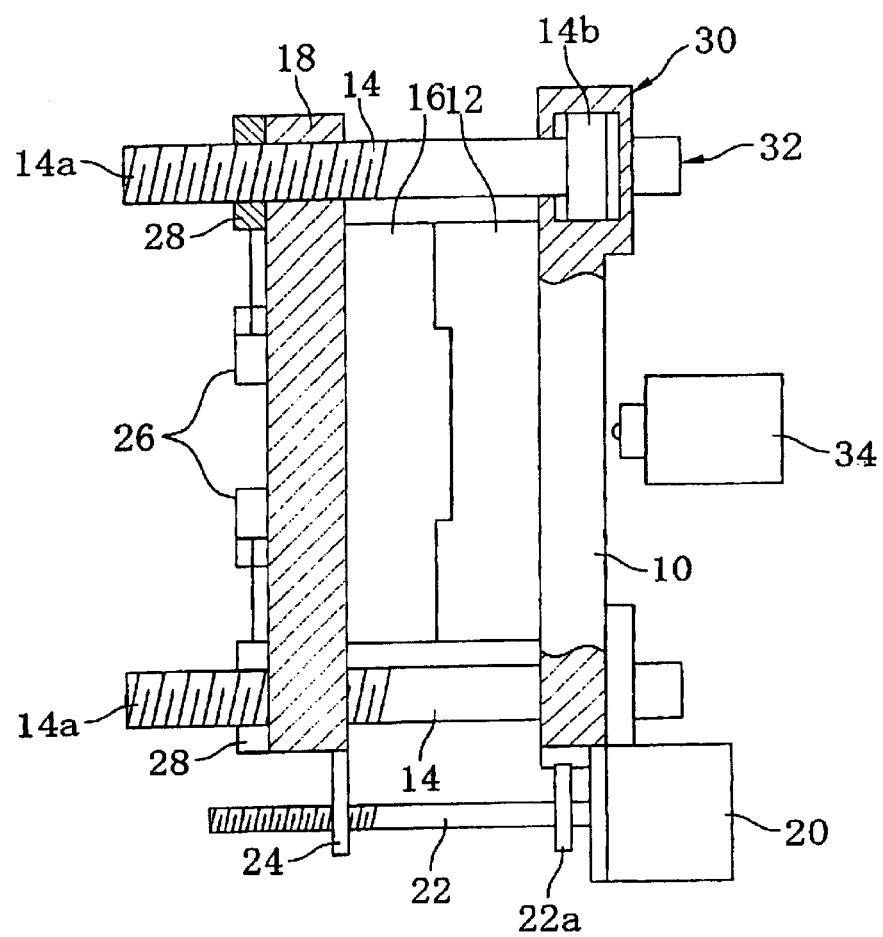
FIG. 7 is an outlined sectional view of the mold clamping mechanism with the molds closed corresponding to completion of adjusting mold thickness in FIG. 6.
Figure 8:
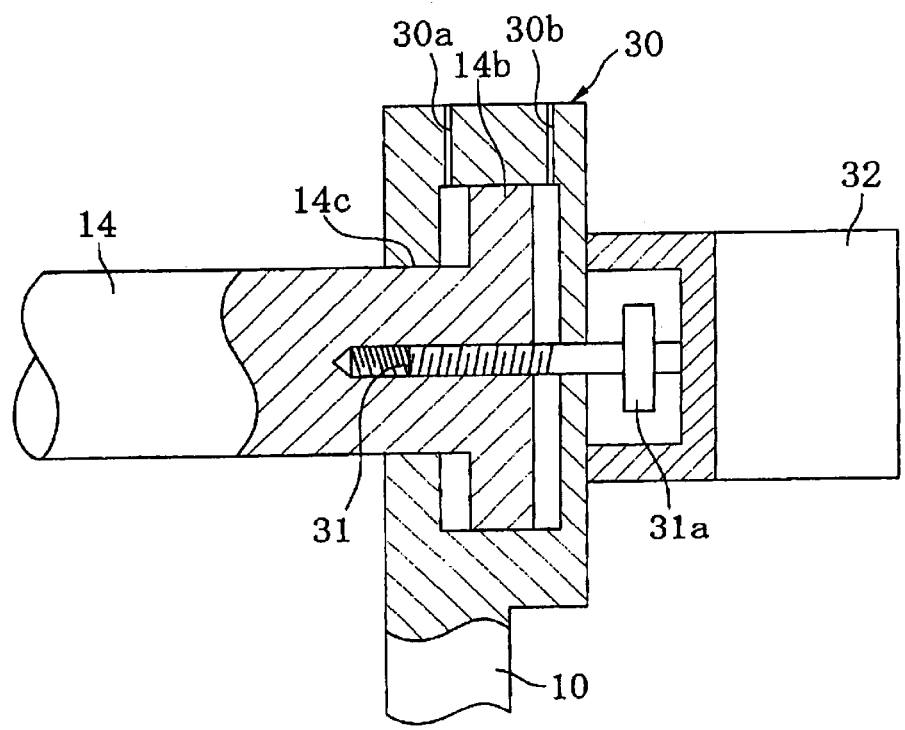
FIG. 8 is an enlarged sectional view of the portion of the mold clamping cylinder in FIG. 6.
Figure 9:
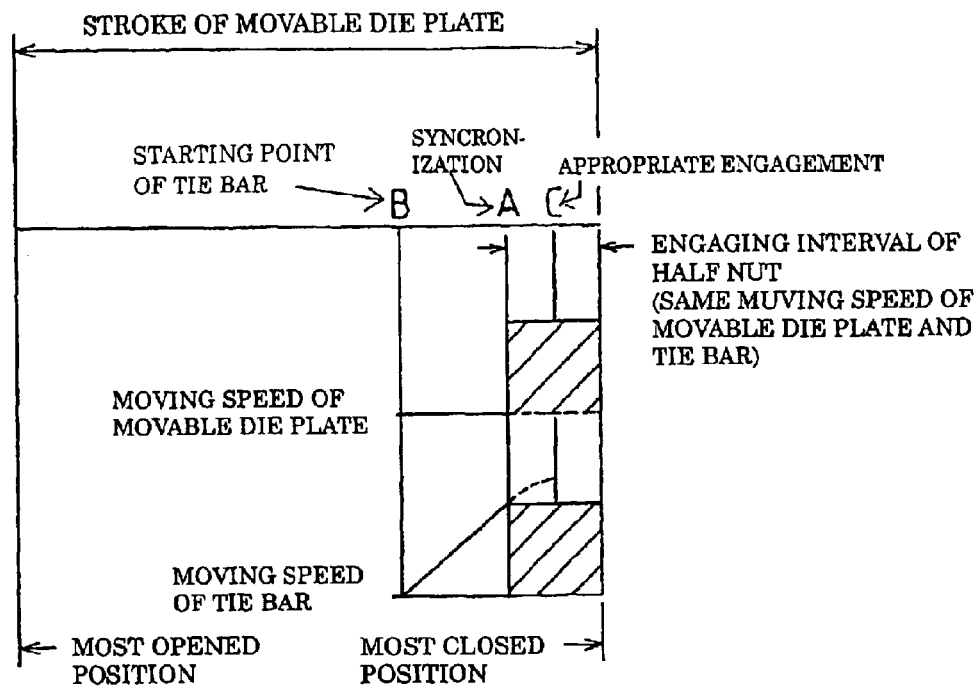
FIG. 9 is a chart showing position diagrams of the movable die plate, the tie bars and the half nut during mold close operation in FIG. 6.

FIG. 5 shows another mold clamping mechanism to which the present invention is applied.

In FIG. 5, reference numerals 50, 52, 54 and 68 represent the same elements with those in FIG. 1, respectively.

There are two main different points on structures between FIG. 1 and FIG. 5. The one is, as shown in FIG. 5, locating the mold clamping cylinder on the movable die plate side, not on the fixed die plate side. The other is locating a nut 88 in the fixed die plate 50 for moving the tie bar 68 during mold close operation, which is screwed with a screw portion 68A formed on the circumference of right end portion of the tie bar 68, and allowed to rotate but refrained from moving in the direction of axis thereof. The nut 88 is rotated by a servomotor 90 provided with a rotary encoder 91 through a transmitting gear 89 and a gear formed on the circumference of the nut 88. The tie bar 68 is refrained from rotating by means of keys, as in FIG. 1.

In FIG. 5, the movable die plate is provided with two parts, that is, a first supporting member 56A and a second supporting member 56B. The first supporting member 56A mounts the movable mold 54 on one side and a ram 86 on the opposite side fixedly.

The second supporting member 56B is provided with a mold clamping cylinder 95 formed therein. The other end portion of the ram 86 is formed with its diameter bigger and slidably inserted as a piston in the cylinder 95. The tie bar 68 is slidably inserted both on the first supporting member 56A and the second supporting member 56B.

Reference numerals 92 and 94 represent a nut with divided portions and a hydraulic cylinder for driving, respectively, by which the screw portion 68B is engaged, as the engaging means 72 in FIG. 1.

A reference numeral 84 represents a hydraulic cylinder for mold close operation. The end portion of the piston rod of the cylinder 84 is fixed to a support member 56C mounted on the lowest portion of the first supporting member 56A.

In the mold clamping mechanism shown in FIG. 1, the mold clamping cylinder 62 executes both functions of moving the tie bar 68 during the mold close operation and of the essential mold clamping operation after the mold close operation. However, in FIG. 5 the mold clamping cylinder 95 has not such combined functions. Though not illustrated, some modifications to the embodiments described above are possible.

The one is to apply the mold clamping mechanism shown in FIG. 1 to a die casting machine.

Another one is to constitute the nut for the engaging means with portions divided more than three.

Still another one is to constitute a drive means for advance and retract of the nut with divided portions by means of a servomotor with position detectors.

Still another one is to constitute the circumference of the tie bar as an engaging portion to be with rack like formation.

Other one is to constitute a groove width of the screw or rack portion on the tie bar to be bigger than that of the screw thread on the nut, or to constitute the groove having a slope for easily engaging.

Such a modification is considered as alteration of design, or design around on the present invention.

According to the method for mold clamping of the present invention, there is an advantage that it executes mold clamping operation without any initial setting works for adjusting thickness of molds and enables the engaging means to operate for completion of engagement making use of the difference of moving speed between the movable die plate and the tie bars during mold close operation, and as the result it greatly shorten the molding cycle, since it executes a mold clamping operation in such a way that, while the mold close operation in which the first drive means moves the movable die plate to the fixed die plate, the third drive means moves the tie bars in the direction of mold closing, and when the relative moving speed between the movable die plate and the tie bars reaches within the predetermined value, the engaging means operates to engage the tie bars with the movable die plate mechanically, then after contact of the movable mold with the fixed mold the second drive means operates to press the movable mold to the fixed mold.

Furthermore, according to the apparatus for mold clamping of the present invention, there is another advantage, in addition to the advantage mentioned above, that it executes automatically the mold clamping operation by the present invention, since it is provided with a mold clamping mechanism comprising a fixed die plate fixedly mounting a fixed mold thereon, a movable die plate fixedly mounting a movable mold thereon and facing to the fixed die plate, a tie bars supported at one end portion by the fixed die plate and slidably supporting the movable die plate so as to advance and retract to the fixed die plate, a first drive means for executing mold open and close operations by advancing and retracting the movable die plate to the fixed die plate, a second drive means for executing mold clamping operation by pressing the movable die plate against the fixed die plate after the movable mold contacts with the fixed mold by operating the first drive means, a third drive means for executing relative movement between the tie bars and the movable die plate in the direction of axes of the tie bars and an engaging means mounted on the movable die plate for executing an engagement with a engaging portion formed on circumference of the tie bars, and further a mold clamping controller for drive control of the first drive means, the second drive means, the third drive means and the engaging means, the mold clamping controller constituting a first command division for instructing a low moving speed of the movable die plate to the first drive means during mold close operation, and for instructing a moving speed of the tie bars different from the low moving speed to the third drive means at the same time when the low moving speed is instructed or thereafter, a detector for detecting a relative moving speed between the movable die plate and the tie bars, a setting division for setting a preferable relative moving speed, within which the engaging means is capable of engagement, and a second command division for instructing the engaging operation when an output signal of the detector reaches the preferable relative moving speed.

Furthermore, according to the apparatus for mold clamping of the present invention, there is still another advantage, in addition to the foregoing advantage, that the structure of the mechanism is constituted with much simpler than before, since the second drive means is used as the third drive means utilizing that each the second and the third drive means operates at different time zone.

It should be understood, of course, that the foregoing disclosure relates only to preferred embodiments of the invention, and that it is intended to cover all changes and modifications of the example of the invention herein chosen for the purpose of the disclosure which does not constitute departures from the spirit and scope of the invention set forth in the appended claims.

What is claimed is:

1. Method for mold clamping in an injection molding machine and the like having a mold clamping mechanism comprising a fixed die plate fixedly mounting a fixed mold thereon, a movable die plate fixedly mounting a movable mold thereon and facing to said fixed die plate, tie bars supported at one end portion by said fixed die plate and slidably supporting said movable die plate so as to advance and retract to said fixed die plate, a first drive means for executing mold open and close operations by advancing and retracting said movable die plate to said fixed die plate, a second drive means for executing mold clamping operation by pressing said movable die plate against said fixed die plate after said movable mold contacts with said fixed mold by operating said first drive means, a third drive means for executing relative movement between said tie bars and said movable die plate in the direction of axes of the tie bars and an engaging means mounted on said movable die plate for executing an engagement with a engaging portion formed on circumference of said tie bars, said method comprising the steps of starting movement of said tie bar in the direction of mold closing by said third drive means so that said tie bar moves at different moving speed with that of said movable die plate during mold close operation in which said movable die plate moves against said fixed die plate by said first drive means, judging a relative moving speed between said movable die plate and said tie bars within a predetermined value, engaging said tie bars with said movable die plate mechanically by operating said engaging means when the relative moving speed is judged to be within the value, then driving said second drive means, thereby executing mold clamping operation.

2. In the method for mold clamping as in claim 1, wherein said starting movement of said tie bars are executed at the same time when the moving speed of said movable die plate changes from high to low by said first drive means.

3. In the method for mold clamping as in claim 1 or 2, wherein either one or both of the moving speeds of said movable die plate and said tie bar are changed in case that said engaging operation is still on the way at a prescribed time passage after said engaging means starts to operate.

4. In the method for mold clamping as in claim 1 or 2, wherein a timing for starting movement of said tie bar is varied at next mold clamping operation, based on a time interval between start and completion of said engaging operation.

* * * * *